Dec. 12, 1939.  G. B. BENTZ  2,183,441
VANITY OR SIMILAR ATTACHMENT FOR BATHTUBS
Filed Aug. 17, 1938  5 Sheets-Sheet 1
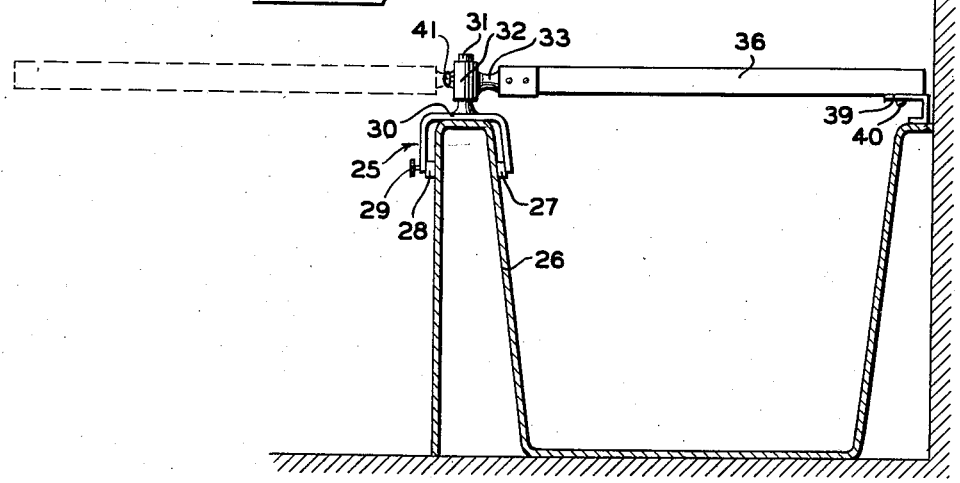
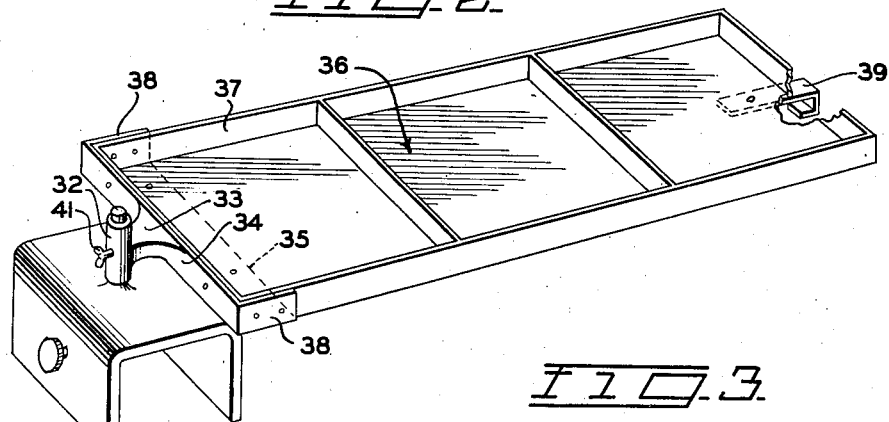
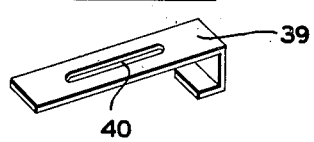
Inventor
GEORGE B. BENTZ
By H. B. Wilson & Co. Attorneys

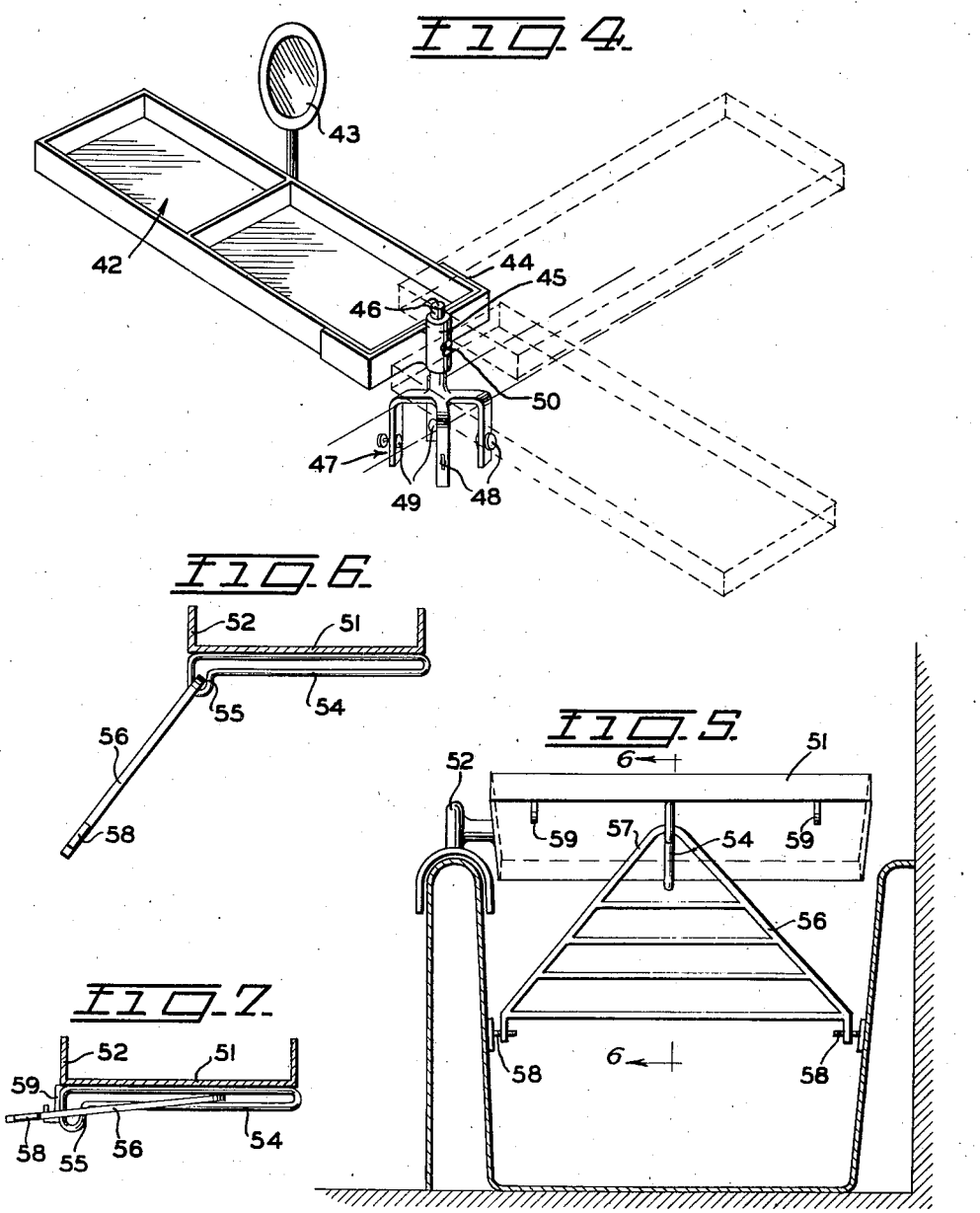

Dec. 12, 1939.   G. B. BENTZ   2,183,441
VANITY OR SIMILAR ATTACHMENT FOR BATHTUBS
Filed Aug. 17, 1938   5 Sheets-Sheet 3
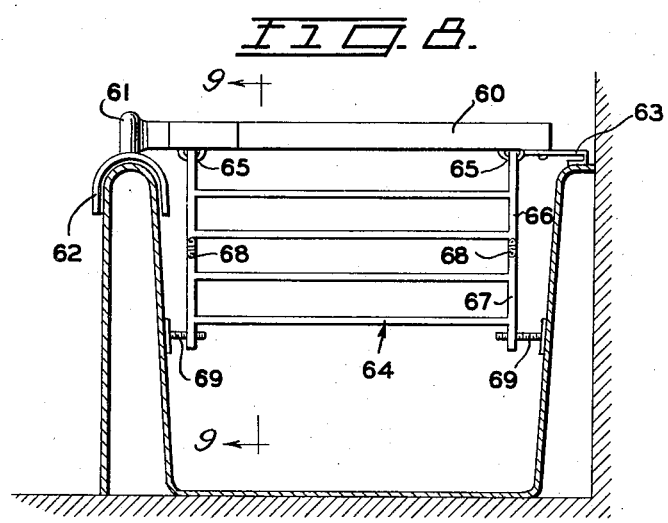
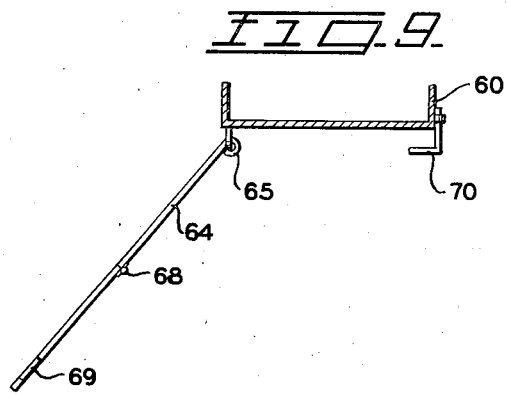
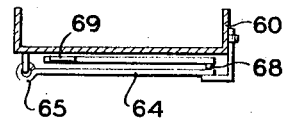
Inventor
GEORGE B. BENTZ Dec. 12, 1939. G. B. BENTZ 2,183,441
VANITY OR SIMILAR ATTACHMENT FOR BATHTUBS
Filed Aug. 17, 1938 5 Sheets-Sheet 4
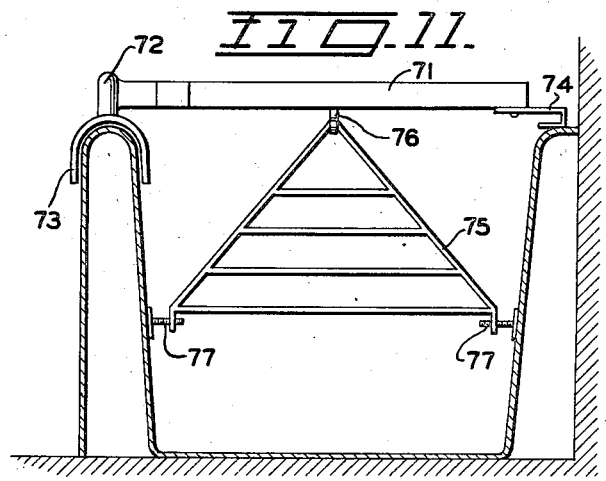
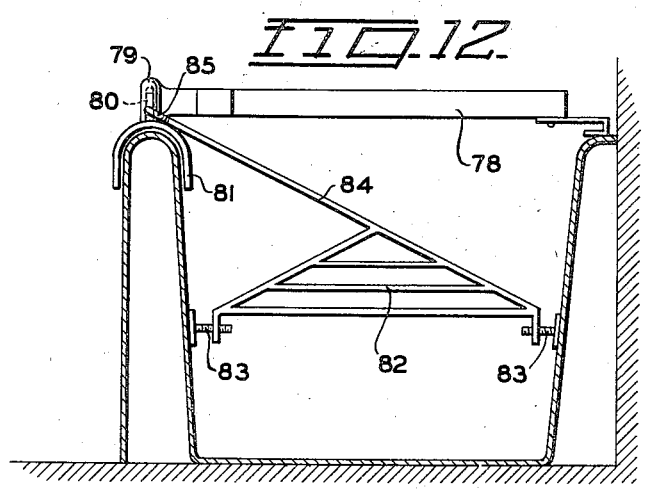
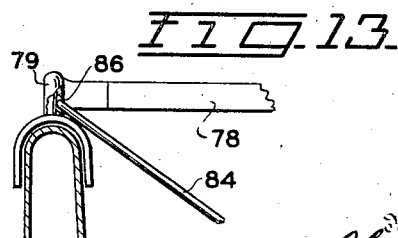
GEORGE B. BENTZ Dec. 12, 1939.　　　　　G. B. BENTZ　　　　　2,183,441
VANITY OR SIMILAR ATTACHMENT FOR BATHTUBS
Filed Aug. 17, 1938　　　5 Sheets-Sheet 5
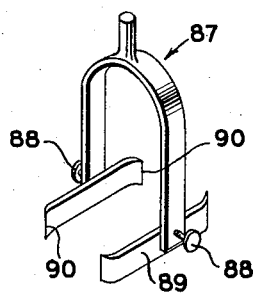
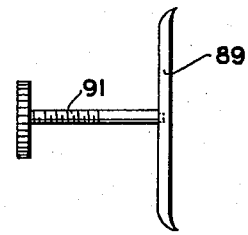
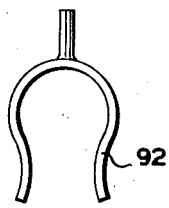
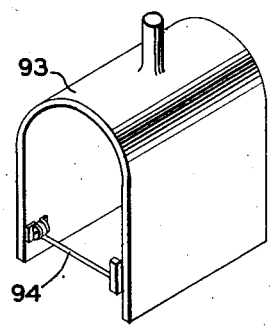
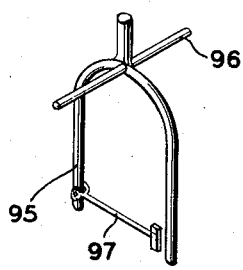
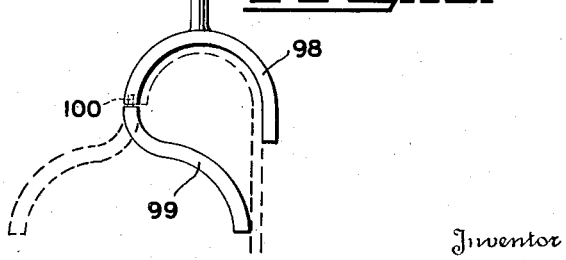
GEORGE B. BENTZ
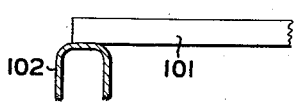

Patented Dec. 12, 1939

2,183,441

UNITED STATES PATENT OFFICE 2,183,441

VANITY OR SIMILAR ATTACHMENT FOR BATHTUBS

George B. Bentz, Bronx, N. Y.

Application August 17, 1938, Serial No. 225,489

10 Claims. (Cl. 4—185)

The invention aims to provide a simple and inexpensive, yet a highly desirable attachment for bathtubs, for manicure, pedicure or vanity purposes.

In carrying out the above end, a tray is provided to contain the desired implements, cosmetics, etc. and another object is to so mount said tray that it may be easily swung to a position in which it projects inwardly from one wall of the tub, to a position in which it projects outwardly from said wall, or to a position overlying said wall.

A still further object is to provide a novel arrangement including a foot-rest for use when beautifying or performing other operations upon the feet, and in this connection, a still further aim is to make novel provision whereby the foot-rest may be folded compactly under the tray when desired.

With the foregoing and minor objects in view, the invention resides in the novel subject matter hereinafter described and claimed, description being accomplished by reference to the accompanying drawings.

Fig. 1 illustrates an edge view of one form of the attachment in position upon a conventional bathtub, the latter being shown in transverse section.

Fig. 2 is a perspective view of the attachment shown in Fig. 1.

Fig. 3 is a perspective view of the adjustable support for the end of the tray remote from the pivot.

Fig. 4 is a perspective view illustrating a different form of attaching clamp for the tray.

Fig. 5 is a perspective view illustrating a different form of construction in which a foot-rest is foldably associated with the tray.

Fig. 6 is a vertical sectional view on line 6—6 of Fig. 5.

Fig. 7 is a view similar to Fig. 6 but showing the foot-rest folded upwardly under the tray.

Fig. 8 is an edge view of the attachment with a different form of foldable foot-rest, in operative position upon a bathtub, the latter being shown in transverse section.

Fig. 9 is a vertical sectional view on line 9—9 of Fig. 8.

Fig. 10 is a view similar to Fig. 9 but showing the foot-rest folded under the tray.

Fig. 11 is a view similar to Fig. 8 but illustrating another association of foot-rest and tray.

Fig. 12 is a view similar to Fig. 11 illustrating still another relation of foot-rest and tray.

Fig. 13 is a detail elevation similar to the upper left-hand portion of Fig. 12, showing a variation which may here be made.

Figs. 14 to 19 are perspective views illustrating various clamps which may be used in the construction of the attachment.

Fig. 20 is an edge view showing a construction in which the clamp and the tray are rigidly secured together.

Preferred features of construction have been illustrated and will be rather specifically described, with the understanding however, that within the scope of the invention as claimed, variations may be made.

In Figs. 1 to 3, the device includes an arched clamp 25 to straddle the outer side wall 26 of a bathtub, the legs of said clamp being provided with relatively fixed and adjustable pads or the like 27 and 28 to tightly abut the inner and outer sides of said wall 26. The pad or the like 28 is preferably adjustable by means of a set screw 29 threaded through one leg of the clamp 25. The crown 30 of this clamp is provided with a rigid upstanding cylindrical stud 31 which is rotatably surrounded by a bearing sleeve 32, said sleeve having an integral horizontally projecting neck 33 integral with a flange 34 which projects upwardly from a horizontal plate 35. Upon this plate, one end of a suitable tray 36 is secured, said tray having upstanding walls 37, one of which is secured to the flange 34. The plate 35 is also provided with two additional upwardly projecting flanges 38 to which two other walls of the tray are secured. The end of the tray 36 remote from the clamp 25, is provided with a support 39 adjustably connected at 40 with the bottom of said tray and movable to such position as to rest upon the inner wall of the bathtub to coact with said clamp in supporting said tray.

The tray 36 is elongated and before the user enters the tub, said tray may be positioned longitudinally over the tub side wall 26, or may be swung outwardly from said wall, allowing all desired equipment to be easily placed in said tray. When the user has bathed in the tub, the tray may be readily swung inwardly to a position in which it extends transversely across said tub, for convenient use. If desired, a set screw or the like 41 may be carried by the bearing sleeve 32 to abut the stud 31 to hold the tray against accidental movement from any position to which it may be swung.

In Fig. 4, a tray 42, similar to the tray 36 is shown, said tray 42 being equipped with a mirror 43 if desired. A support 44 secured to one end of the tray 43 is provided with a vertical bearing 45 surrounding an upstanding rigid stud 46 on a four-legged clamp 47 to straddle the tub wall, all four legs of said clamp being provided with clamping screws 48 for adjusting pads or the like 49 into tight contact with the tub wall. At 50, I have shown a small tubular casing projecting from the bearing 45, and said casing may well contain a spring-pressed ball, pin or the like to coact with the stud 46 to hold the tray in any position to which it may be swung, said stud 46 preferably having sockets to receive said ball, pin or the like. As this construction, however, is well known in various arts, it has not been detailed.

In Figs. 5, 6 and 7, a tray 51 is shown pivotally mounted at 52 upon a clamp 53 to straddle the tub wall. Secured to the lower side of the tray 51 and horizontally elongated in a direction at right angles to the length of said tray, is a metal loop 54 having a downturned rear end 55. A foot-rest 56 is provided, said foot-rest being preferably of the triangular form shown and having a loop or the like 57 at its upper end slidably and pivotally engaged with the loop 54. The lower end of the foot-rest 56 is provided with suitable adjustable supports 58 to abut the inner surfaces of the tub side walls. When the foot-rest is to be operatively positioned, its loop 57 is dropped into the downturned end 55 of the horizontal loop 54, and the supports 58 are adapted to support said foot-rest in any desired inclined position, as will be clear from Fig. 6. When use of the foot-rest is not desired, its upper end is lifted out of the loop end 55. The entire foot-rest is then slid under the tray 51 and said foot-rest is swung upwardly to a horizontal position, in which it may be held by engaging it with suitable hooks 59 carried by the tray.

In Figs. 8 to 10, the tray 60 is pivotally connected at 61 with an arched clamp 62 to straddle a tub wall, the opposite end of said tray being provided with an adjustable support 63 to rest on the other wall of the tub. A foot-rest 64 is pivoted at 65 to the rear edge of the tray 60, said foot-rest being composed of upper and lower sections 66 and 67 hingedly connected with each other by hinges 68 which may break or swing only in one direction. The lower end of the foot-rest 64 is provided with adjustable supports 69 to abut the tub side walls. When the foot-rest is not required, its sections 66 and 67 may be folded upon each other and folded upwardly under the tray 60, in which position the parts may be held by a pivoted latch or the like 70.

In Fig. 11, the tray 71 is pivoted at 72 to an arched clamp 73 to engage one side wall of a tub, and an adjustable support 74 is provided on said tray to rest upon the other side wall. A foot-rest 75 similar to that shown in Fig. 5, may be engaged with a hook 76 carried by the tray 71, the lower end of the foot-rest being provided with adjustable tub-abutting supports 77. When the foot-rest is not required, it may be simply unhooked from the tray and laid aside.

In Figs. 12 and 13, the tray 78 is provided with a bearing 79 surrounding an upstanding stud 80 on the tub-engaging clamp 81. A foot-rest 82 is provided, said foot-rest having adjustable supports 83 at its lower end. The upper end of this foot-rest is provided with an inclined rod 84 rigidly secured thereto, the upper end of said rod being engaged with the bearing 79 to brace the foot-rest 82 and hold it in operative position. In Fig. 12, the rod 84 is provided with a fork 85 to straddle the bearing 79 under the tray 78. In Fig. 13, the upper end of the rod 84 is hooked into an opening 86 in the bearing 79.

Any of various kinds of clamps may be used to straddle the tub side wall and pivotally mount the tray, whether the tub be of the modern double-wall form or of the old rolled rim type. In Figs. 14 to 19, I have shown a number of clamps which may be used, and they will be briefly described.

In Fig. 14, an arched clamp 87 is shown, both legs of said clamp being provided with set screws 88, the inner ends of these set screws being swiveled to elongated clamping plates 89 having inwardly curved ends 90 to engage the tub walls. This construction is intended for a double-wall tub. When the clamp is to be used on a tub having a rolled rim, a longer screw 91 (Fig. 15) is substituted for one of the screws 88 to extend inwardly under the rolled rim, the screw being of course swiveled to one of the clamping plates 89.

In Fig. 16, a one-piece spring metal clamp 92 is provided to be sprung over the tub wall and to frictionally engage the same.

In Fig. 17, a relatively wide one-piece clamp 93 is shown to straddle a tub wall, and if the clamp is to be used upon a rolled rim tub, a swingable arm 94 may be connected pivotally with one leg of the clamp to underlie the tub rim and abut the wall.

Fig. 18 discloses an arched rod 95 to straddle the wall of a tub, the crown of said rod being provided with a straight rod 96 to rest upon the tub rim and hold the clamp in proper position. If desired, one leg of the clamp may be provided with a swingable arm 97 for the same purpose as the arm 94 above described.

The substantially arched clamp 98 shown in Fig. 19 is intended for a rolled rim tub, and one leg 99 of said clamp is pivotally mounted at 100 to swing inwardly under the rolled rim and abut the tub wall.

In Fig. 20, I have illustrated a tray 101 welded or otherwise rigidly secured at one of its ends to an arched clamp 102 to straddle the tub wall.

From the foregoing, taken in connection with the accompanying drawings, it will be seen that novel and advantageous provision has been made for carrying out the objects of the invention. While preferred details have been disclosed, attention is again invited to the possibility of making numerous variations within the scope of the invention as claimed.

I claim:

1. A bathtub attachment comprising an arched clamp to straddle a bathtub side wall, the crown of said arched clamp being provided with a rigid upstanding cylindrical stud, a bearing sleeve rotatably surrounding said stud and provided with a horizontally projecting neck, a horizontal plate having upstanding flanges one of which is joined to said neck, and an elongated tray having one end of its bottom secured upon said plate, said tray having upstanding walls secured to said flanges.

2. A bathtub attachment comprising an arched clamp to straddle a bathtub side wall, a tray projecting horizontally from said clamp, means pivotally mounting said tray on said clamp for movement to a position in which it projects inwardly from said tub wall, or to a position in which it overlies said tub wall, said tray being elongated to extend transversely of the tub, and an adjustable support on the end of the tray remote from said clamp to rest on the other side wall of the tub.

3. A bathtub attachment comprising an arched clamp to straddle a bathtub side wall, a tray projecting horizontally from said clamp, means pivotally mounting said tray on said clamp for movement to a position in which it projects inwardly from said tub wall, or to a position in which it overlies said tub wall, said tray being elongated to extend transversely of the tub, and a foot-rest connected with said tray to extend transversely of the tub, said foot-rest being provided with tub abutting portions to coact with the tray in supporting it in operative position, the connection between said foot-rest and tray being such as to allow movement of said foot-rest to an out-of-the-way position when the tray is to overlie the tub wall.

4. A bathtub attachment comprising an arched clamp to straddle a bathtub side wall, a tray projecting horizontally from said clamp, means pivotally mounting said tray on said clamp for movement to a position in which it projects inwardly from said tub wall, or to a position in which it overlies said tub wall, said tray being elongated to extend transversely of the tub, and a foot-rest connected with said tray to extend transversely of the tub, said foot-rest being provided with tub abutting portions to coact with the tray in supporting it in operative position, the connection between said foot-rest and tray being such as to allow folding of said foot-rest horizontally under the tray when the latter is to overlie the tub wall.

5. A bathtub attachment comprising an elongated tray to extend transversely of a bathtub and provided with supporting means, a rigid loop secured to the lower side of said tray and elongated horizontally in a direction at right angles to the length of said tray, one end of said loop being turned downwardly, an inclined foot-rest to extend transversely of the tub, the upper end of said foot-rest being provided with a supporting portion engaged slidably and pivotally with said loop to drop into said downturned loop end when said foot-rest is operatively positioned and to slide to the other end of the loop when use of the foot-rest is not required, thereby permitting upward swinging of said foot-rest under the tray, and means for holding said foot-rest in its upwardly swung position.

6. A bathtub attachment comprising an elongated tray to extend transversely of a bathtub and provided with supporting means, and inclined foot-rest pivoted at its upper end to said tray and composed of upper and lower hingedly connected sections, said sections being foldable against each other and foldable upwardly against the tray when the foot-rest is not in use, and means for holding said foot-rest sections in said folded position.

7. A bathtub attachment comprising an arched clamp to straddle a bathtub side wall, the crown of said arched clamp being provided with a rigid upstanding cylindrical stud, a bearing rotatably surrounding said stud, a tray secured to said bearing to occupy a position extending inwardly from said tub wall or a position overlying said wall, an inclined foot-rest to extend transversely in the tub, the lower end of said foot-rest having supporting portions to contact with the tub, and a brace rod secured to the upper end of said foot-rest and having a portion to engage said bearing.

8. A bathtub attachment comprising an arched clamp to straddle a bathtub side wall, a horizontally elongated pan-like tray pivoted at one of its ends upon the upper end of said clamp on a vertical axis, said tray being of a length to extend substantially throughout the width of the tub when swung inwardly across the latter, to hold pedicure implements and the like for use by a bather seated in the tub.

9. A structure as specified in claim 8; the free end of said tray being provided with a supporting portion to rest on the side wall of the tub opposite said clamp.

10. A structure as specified in claim 8; together with a foot-rest connected with and projecting downwardly from said tray for use by the bather when seated in the tub.

GEORGE B. BENTZ.